(12) United States Patent
Samuel

(10) Patent No.: US 7,816,943 B2
(45) Date of Patent: Oct. 19, 2010

(54) PROGRAMMABLE CYCLE STATE MACHINE INTERFACE

(75) Inventor: Roshan Samuel, Queen Creek, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 12/139,640

(22) Filed: Jun. 16, 2008

(65) Prior Publication Data

US 2009/0309629 A1    Dec. 17, 2009

(51) Int. Cl.
   *H03K 19/173*    (2006.01)
(52) U.S. Cl. ...................................... 326/37
(58) Field of Classification Search ............. 326/37–41, 326/47, 101
   See application file for complete search history.

(56) References Cited

U.S. PATENT DOCUMENTS 5,371,518 A * 12/1994 Hannah ....................... 345/534
6,750,876 B1 * 6/2004 Atsatt et al. .................. 345/656
7,159,083 B2 * 1/2007 Samuel et al. .............. 711/156
2003/0117382 A1  6/2003 Pawlowski et al. .......... 345/204

OTHER PUBLICATIONS

Invitation to Pay Additional Fees and, Where Applicable, Protest Fee, PCT/US2009047335, 7 pages, Sep. 3, 2009.
International Search Report and Written Opinion, PCT/US2009/047335, 18 pages, Nov. 11, 2009.
Epson: S1D13505 Embedded RAMDAC LCD/CRT Controller, Graphics S1D13505, pp. 1-2, Oct. 2001.
Epson: Exceed Your Vision, S1D13705 Embedded Memory LCD Controller, Hardware Functional Specification, Document No. X27A-A-001-10, pp. 1-86, Sep. 18, 2007.

* cited by examiner

*Primary Examiner*—Rexford N Barnie
*Assistant Examiner*—Thienvu V Tran
(74) *Attorney, Agent, or Firm*—King & Spalding L.L.P.

(57) ABSTRACT

A programmable cycle state machine interface to a microcontroller comprising a programmable cycle state machine, a first and second data bus, a first and second control output, and a control input for programming the cycle of the state machine. The programmable nature of the state machine allows for design and implementation changes without the need to redesign customized state machine logic on the microcontroller.

14 Claims, 9 Drawing Sheets

PROGRAMMABLE CYCLE STATE MACHINE INTERFACE

TECHNICAL FIELD

The technical field of the present application relates to microcontroller interfaces to peripheral devices.

BACKGROUND

Microcontrollers are widely used in consumer and industrial products to provide sophisticated user interaction and digital control at a small incremental cost. For example, rather than having a switch and a simple timer to control a coffee machine, a microcontroller with a small touchscreen liquid crystal display (LCD) could provide a superior user experience and allow for increased customization of the brew cycle, real-time status of the process and possible interaction with other household devices. A refrigerator might incorporate a microcontroller with an graphics display to track not only the performance of the refrigerator, but also the contents of the refrigerator. This would enable warnings of food expiration, automatic generation of a shopping list, and the automatic ordering of groceries from a delivery service. An industrial application might indicate the operational status of a backup power generator as well as a maintenance schedule combined with a log of performed maintenance and repair.

Where a graphical display is desired, a microcontroller is interfaced with the graphical display using a customized state machine specific to a type of display and possibly limited to particular geometries and color depths. The customized state machine must be redesigned if the characteristics of the display change. For example, the user requirements may change over time such that a monochrome display may be upgraded to a color one on new or existing machines. Alternatively, a different display technology may be substituted if the component pricing fluctuates significantly or where new environmental conditions. Prior to this invention, a change from a monochrome LCD to an active matrix thin-film transistor (TFT) display might require a redesign of the application specific integrated circuit (ASIC) in which the microcontroller and state machine are embedded. The other known approach is to use an off-chip LCD controller (e.g. EPSON Embedded RAMDAC LCD/CRT Controller part S1D13505F00A) adding cost and complexity to the system.

Microcontrollers may also be employed with other parallel data sources or input/output devices to enrich the functionality of existing products and systems or to create new products and systems only possible with computer processing capabilities. Such peripherals include sensor arrays, network interfaces, and multi-point and pressure sensitive touch screens. A great number of possible input or output devices may be incorporated using a parallel data interface and one or more control signals. As with graphical displays, custom logic or external controllers have been required to interface a microcontroller with these input/output devices.

SUMMARY OF THE INVENTION

According to an embodiment, a programmable cycle state machine on an integrated circuit may comprise a first central processing unit (CPU); a memory interfaced with the CPU; a state machine; a first data bus connecting the memory to the state machine; a second data bus; a clock input; a first control output; a second control output; and a control input, wherein the value of the first control output is a function of the clock input, the current state of the state machine, and the control input; wherein the value of the first data bus can be output on the second data bus as a function of the clock input, the current state of the state machine, and the control input; wherein the second control output requests the next value for the input data bus; and wherein the state machine is programmable through the control input.

According to another embodiment, a programmable cycle state machine on an integrated circuit may comprise a frame counter and logic for generating a frame signal on a first control output; a line counter and logic for generating a line signal on the first control output; a memory to store and forward a value from a data input that is connected to a microcontroller to a data output that is connected to a graphics display; logic for generating a data shift signal on a second control output and a control signal on the first control output; and a control input for programming the cycle of the state machine to control the timing and duration of the frame signal, the line signal, the control signal, and the data shift signal.

According to yet a further embodiment, a method for providing digital graphics data and control signals to a graphics display using a programmable cycle state machine on an integrated circuit may comprise steps of accepting instructions on a first control input describing the input timing requirements of a graphics display, the geometric specifications of the graphics display, and the color depth information of the graphics display; providing a signal on a first control output capable of controlling the graphics display; providing a signal on a second control output capable of requesting a next unit of digital graphics data from a memory or CPU; and transmitting digital graphics data from a data input connected to the memory or CPU to a data output in compliance with the input timing requirements of the graphics display connected to the data output.

Other technical advantages of the present disclosure will be readily apparent to one skilled in the art from the following figures, descriptions, and claims. Various embodiments of the present application may obtain only a subset of the advantages set forth. No one advantage is critical to the embodiments.

BRIEF DESCRIPTION OF THE DRAWINGS

A more complete and thorough understanding of the present disclosure and advantages thereof may be acquired by referring to the following description taken in conjunction with the accompanying drawings, in which like reference numbers indicate like features. Preferred embodiments of the invention and its advantages are best understood by reference to FIGS. 1-12.

DETAILED DESCRIPTION

Figure 1:
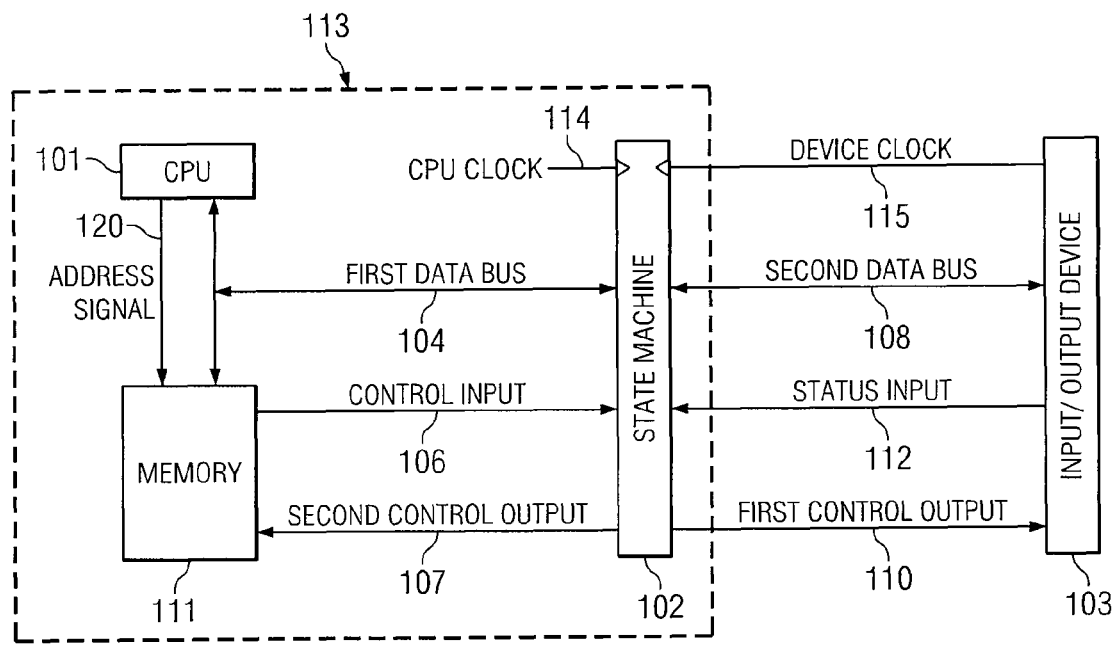
FIG. 1 is a block diagram showing the core components of one embodiment of the microcontroller and programmable cycle state machine interface connected to an input/output device.

In one embodiment of the present invention, a microcontroller is produced incorporating a programmable cycle state machine on the same chip with a central processing unit (CPU) and a memory. This microcontroller is suitable for direct connection to a wide variety of external display modules including most types of liquid crystal display (LCD) module having a parallel data interface. This LCD module typically includes counting and addressing logic to transmit the data from the parallel interface to the individual pixels. However, the LCD module need not incorporate any additional timing or addressing logic that would allow it to interface directly with a video memory such as direct memory access (DMA) logic. In this embodiment, software running on the microcontroller creates a digital representation of an image. This image may be a still image or a single frame of video. This may be by simply loading an existing image file into the memory or may be by creating an image using one of any number of well known techniques for building an image using software. If the application provides for user interaction, the image might include recognizable elements for data display, text or numerals and system control functions combined to create a graphical user interface (GUI). If the software needs to change one pixel, it need only change the data value representing that pixel in memory.

Operating independently from (and typically asynchronously with) the CPU, the programmable cycle state machine is performing a continuous loop that reads from the memory each value representing that image and transmits that value to the LCD module via the parallel interface. At certain points in that continuous loop, the programmable cycle state machine activates or deactivates one or more control signals as required by that specific type or model of LCD module. Because of the nature of many graphical display technologies, this loop continues even of the image data has not changed; the individual light blocking or light generating elements of the display maintain their current state for a small window of time and must be refreshed periodically.

In a further embodiment, the control input selects from a predetermined subset of common LCD display technologies in order to determine the necessary control output signal waveforms and timing specifications. The control input also specifies the physical geometry of the graphics display—the width and height in pixels—as well as the pixel depth supported by that graphics display in terms of levels of grayscale or the color depth of a color display. The first control output of the programmable cycle state machine in this embodiment must support signals indicating the boundary of a frame of pixel information, the boundary of a line of pixel information, the complete presentation of a unitary transfer of data across the bus, and a multipurpose signal. The multipurpose signal may be connected to an LSHIFT2 input, a MOD input, or a DRDY input. The second control output must support a data shift signal indicating that the state machine is ready for the next data transfer from the memory. In this embodiment, the state machine must comprise a frame counter, a line counter, and a data register. Finally, the state machine must comprise logic for maintaining the appropriate values of the counters, enabling or disabling the outputs, and generating the various control signals.

In another embodiment, the programmable cycle state machine is incorporated within the same integrated circuit as the microcontroller and graphics processing circuitry. In this embodiment, the microcontroller may include a 16-bit CPU, but still have the capability of displaying color graphics, images or video on an external display. That display may be at least as small as 64×64 pixels and at least as large as 852×480 pixels. Support for larger displays is possible as well. The pixel depth might typically range from one bit per pixel to twenty four bits per pixel, where twenty four bits per pixel represents eight bits of each of three primary colors. The primary colors may be red, green and blue, or may be represented in other forms. In particular, if a display technology uses subtractive color technology, the primary colors might be red, yellow and blue.

In another embodiment, a bistable (or multistable) display might be employed, which would eliminate the need for continuous refresh of pixel information. In this enablement, the programmable cycle state machine might poll the memory for changes or might be triggered by the CPU when a change is made. Once the change is detected or announced, the programmable cycle state machine would then output the entire block of image data to the display in the same general process as described above. Further optimizations are possible as well where the display allows for addressing of blocks of image data or even individual pixels. These optimizations would require logic and additional memory for detecting changes at a block level or even a pixel level. This change detection might be handled through the maintenance of a duplicate copy of the image data to allow for a comparison at any time between what should be displayed and what is currently displayed. Alternatively, various hashing algorithms could be employed to determine which part, if any, of the image data has been modified. In either embodiment, only the changed block or blocks or the changed pixel or pixels would be read and transmitted by the programmable cycle state machine in conjunction with appropriately timed control signals.

A person of ordinary skill in the art would understand that this programmable cycle state machine would be useful with other output devices. For example, an audio codec requires a steady stream of digital audio data read from a memory and could be controlled with a programmable cycle state machine. Any output device with a parallel data interface that requires streaming of digital data with coordinated timing or control signals could be connected to the programmable cycle state machine in this embodiment without custom logic, or with minimal off-chip custom logic.

In another embodiment, the programmable cycle state machine may comprise additional control logic to allow input from an external data source. This data source could be an analog to digital converter for audio or other signal capture purposes or could be an array of sensors such as an image capture device. In this embodiment, the programmable cycle state machine might accept a trigger signal from the CPU or the external input device and would begin one or more read cycles from that the external input device. As in the case of the embodiment driving a standard graphics display, this embodiment might be configured to continuously read the captured data without regard to changes in the data or it might be configured to operate on an as-needed basis triggered by a data change.

The specific descriptions herein should not be considered limiting as one of ordinary skill in the art would understand the need to make specific design trade-offs based on a particular application or marketing plan. The data path described herein is typically a parallel data path and may be a bus or a direct connection, but one of ordinary skill in the art would recognize that the data path can be implemented using a serial connection or a serial bus. Furthermore, the state machine could convert a serial data source to a parallel one or convert a parallel data source to a serial one. The data passed via the data input to the data output may be digital audio and/or graphical data. The second control output indicates to a data source that the state machine is ready for additional data. The data source may be a register, a direct memory access (DMA) device, or a first in first out (FIFO) memory. The specific implementation of the data source is not of significance to this invention and one of ordinary skill in the art would understand that substitutions are appropriate here. The control input may be provided by a register, read only memory (ROM), flash memory, mechanical switches such as dual-inline-pin (DIP) switches, or any other source.

In a further embodiment, the CPU is paired with a dedicated graphics processing unit (GPU) capable of implementing graphics specific routines that would require significant processing power if implemented in software on the general purpose CPU. This embodiment would allow a modest CPU, say a 16-bit, low MIPS design, to produce graphics on an external display while still having spare processing capacity to handle other application logic. The GPU of this embodiment might perform bit blitting operations or hardware sprite drawing allowing the processor to send high-level raster operations to combine bitmap patterns or render simple computer graphics. Alternatively, the GPU could implement more sophisticated routines implementing macros to draw graphical user interface elements including lines, windows and menus as well as handle image or video decoding functions. In this embodiment, the CPU sends a command to the GPU to make a change to the display output. This command would be implemented by the GPU to modify the video data in the memory. In a typical embodiment, the programmable cycle state machine is asynchronously and continuously reading this video data from the memory to output to the video display. Any visual "artifacts" resulting from displaying the video data before the modifications have been completed will be overwritten by a subsequent refresh of the video data by the programmable cycle state machine.

In a further embodiment, the CPU is paired with a digital signal processing (DSP) unit that can implement floating point arithmetic and array operations. In this embodiment, the CPU can offload specialized and intensive data processing requests to the DSP so that the CPU utilization remains low enough to be responsive to user requests and real-time tasks.

Turning to the drawings, exemplary embodiments of the present application will now be described. FIG. 1 depicts the core components of one embodiment of the microcontroller 113 and programmable cycle state machine interface 102 connected to an input/output device 103. CPU 101 is shown connected to memory 111 and first data bus 104, however one of ordinary skill in the art would appreciate that the specific interconnection of these components could be varied without impacting function or utility of the invention. Moreover, appropriate select signals or addressing signals 120 can be provided. Likewise, one of ordinary skill in the art would understand how to add additional CPU 101 or memory 111 components to further the goals of the invention by increasing performance characteristics of the microcontroller. First data bus 104 is shown connected to the programmable cycle state machine 102, the memory 111 and the CPU 101. A direct connection to a memory 111 or a direct memory access (DMA) device is also contemplated. Memory 111 might be a register, a FIFO memory device, or any other common memory type. In the figure, memory 111 provides the values for control input 106, but other arrangements for providing some or all of the values to control input 106 are contemplated including, but not limited to, physical switches, or a programmable read only memory (PROM). For the purpose of providing a value on control input 106, a single layer memory such as a register may be preferable.

Second control output 107 is shown connecting state machine 102 to memory 111 in a configuration allowing sequential reads from or writes to that memory. One of ordinary skill in the art would appreciate the possibility of connecting 107 second control output to an interrupt port on CPU 101 where input is retrieved from input/output device 103 and status input 112 indicates the status of input/output device 103 with one or more status or timing signals. CPU clock 114 is shown as an input to state machine 102, however one of ordinary skill in the art would recognize that this clock signal will be available to any microcontroller component. Device clock 115 allows the programmable cycle state machine to generate signals synchronized with the device timing domain. Second data bus 108 provides a data path between state machine 102 and input/output device 103. This data path is likely a bus and likely a parallel bus, but it could be a direct connection and could be a serial data path. First control output 110 provides a control signal to input/output device 103 and many applications will provide a number of control signals providing control and/or timing information.

While FIG. 1 shows the input/output device 103 as being external to the microcontroller 113, one of ordinary skill in the art would understand that the input/output device could be incorporated into the same integrated circuit. For example, an image capture sensor could be incorporated into the same integrated circuit as the microcontroller to reduce cost and application size and power requirements. Furthermore, one of ordinary skill in the art would recognize the value of incorporating more than one programmable cycle state machine 102 into the microcontroller where more than one input/output device 103 are to be connected.

The following figures and description relate to an application of the programmable cycle state machine used to interface a microcontroller with a variety of display types. In one application, the programmable cycle state machine is meant to interface with the parallel data interface of an LCD module. The digital input to LCD module accepts data in the form of 'frames', where one frame is defined as one full screen of display information. Within each frame is a series of 'lines,' one for each row. Within each line are multiple data transfers as the width of the LCD display is substantially wider than the data path into the LCD module. The frame, line and shift periods are, therefore, used as the basis of the state machine design in this embodiment. This allows for the construction of a state machine that covers the superset of the required timing for all the supported LCD types. When a specific LCD type is to be interfaced, all that changes in the state machine behavior is polarity and timing of the outputs. These changes and the relative time placements and duration of each signal are made using external inputs.

Figure 2:
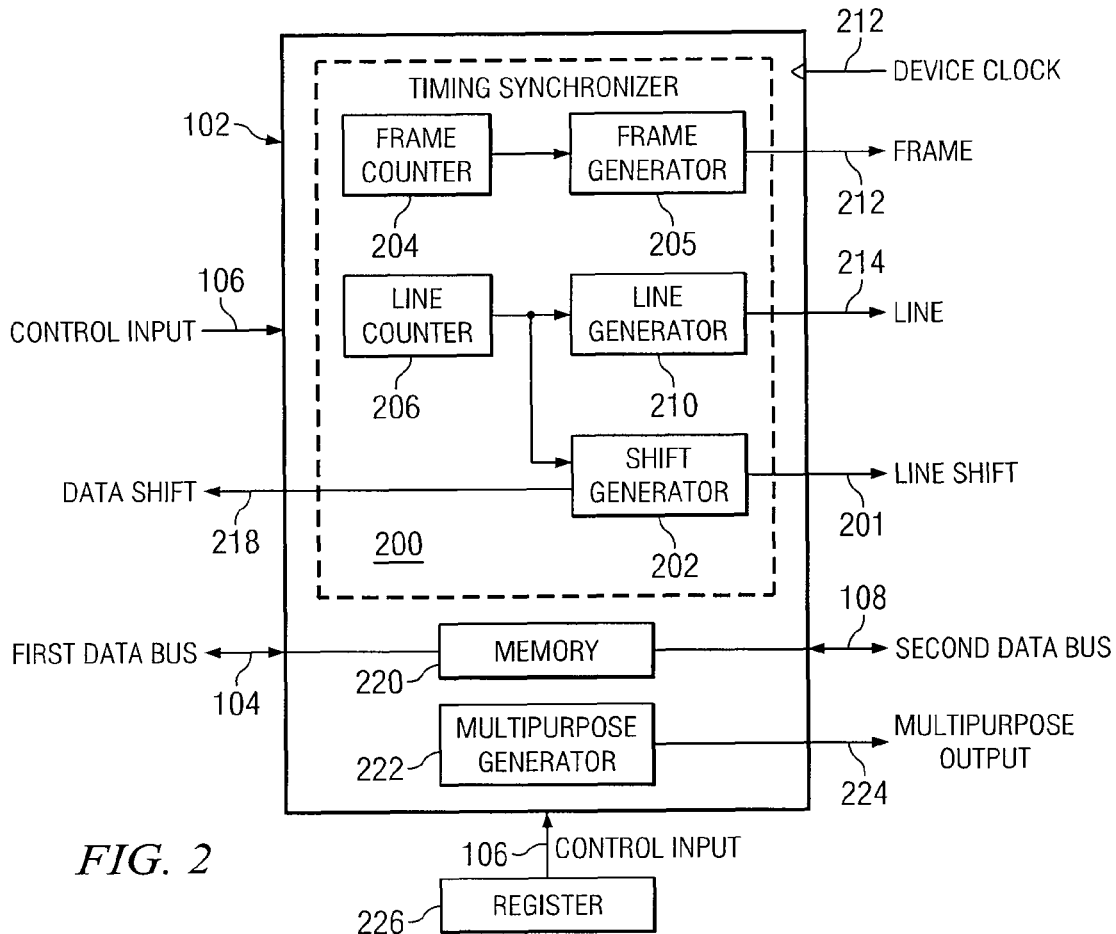
FIG. 2 is a block diagram showing the internal components of one embodiment of the programmable cycle state machine.

FIG. 2 depicts one embodiment of a programmable cycle state machine 102 enabled to drive a video display device. Frame counter 204 counts data values transferred and resets when a full frame of video data has been transferred. Frame generator 205 generates a signal on the frame 212 output based on the value of frame counter 204 and that of control input 106. Line counter 206 counts data values transferred and resets when a full line of video data has been transferred. Line generator 210 generates a signal on line 214 based on the value of line counter 206 and control input 106. Shift generator 202 generates a signal on line shift 201 based on the value of line counter 206 and control input 106. Shift generator 202 also generates a signal on data shift 218 based on the value of line counter 206 and control input 106, this signal being used to request data on first data bus 104. First data bus 104 provides a source of graphics data stored in memory 220 and forwarded to second data bus 108. Multipurpose generator 222 generates a signal on the multipurpose output 224, which can be used to generate a DRDY, MOD, or DSHIFT2 input required by various LCD types. Register 226 stores the program for the programmable cycle state machine and provides control input 106. Timing synchronizer 200 is a subset of the component parts of the programmable cycle state machine. Device clock 115 controls most of the timing of programmable cycle state machine 102.

Figure 3:
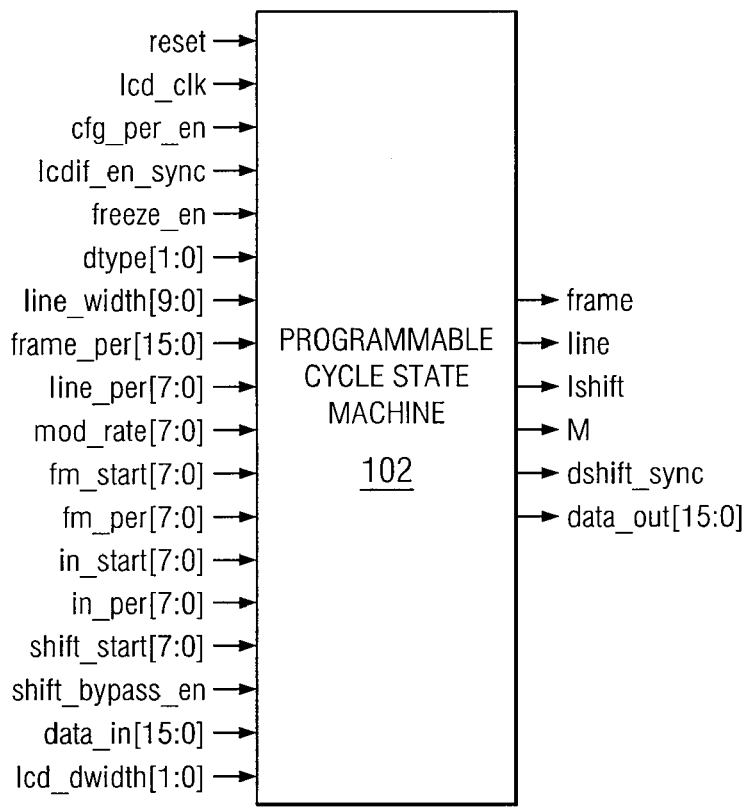
FIG. 3 is a block diagram showing the input and output signals of one embodiment of the programmable cycle state machine.

FIG. 3 depicts an embodiment of programmable cycle state machine 102 enabled to interface with an LCD display driver. Each input and output is described the following table. While some of the inputs and outputs in this figure and table have fixed data widths and hard-coded values, the data widths and hard-coded values could be adjusted to meet different application requirements.

TABLE

| Input/Output Descriptions | |
|---|---|
| Input/Output Name | Description |
| reset | State machine reset |
| lcd_clk | Clock input in the LCD timing domain |
| cfg_per_en | State machine enable |
| lcdif_en_sync | Start LCD timing engine and associated counters |
| freeze_en | Debug mode |
| dtype[1:0] | Display type:<br>00 = Monochrome<br>01 = STN Format 1<br>10 = STN Format 2<br>11 = TFT |
| line_width[9:0] | Number of columns in the glass |
| frame_per[15:0] | Number of lcd_clk cycles in one frame |
| line_per[7:0] | Number of lcd_clk cycles in one line |
| mod_rate[7:0] | Toggle frequency |
| fm_start[7:0] | Frame counter value at which to make frame output active |
| fm_per[7:0] | Frame counter value at which to make frame output inactive |
| ln_start[7:0] | Line counter value at which to make line output active |
| ln_per[7:0] | Line counter value at which to make line output inactive |
| shift_start[7:0] | Line counter value at which to start clocking |

TABLE-continued

| Input/Output Descriptions | |
|---|---|
| Input/Output Name | Description |
| | out valid data on data_out[15:0] |
| shift_bypass_en | Output lcd_clk on the lshift output whenever lcdif_en = 0 |
| data_in[15:0] | LCD data input |
| lcd_dwidth[1:0] | LCD glass data width indicator:<br>00 = 1 to 4 bits wide<br>01 = 5 to 8 bits wide<br>1X = 9 to 16 bits wide |
| frame | LCD frame sync output |
| line | LCD line sync output |
| lshift | LCD line shift clock |
| M | LSHIFT2 when dtype[1:0] = 01<br>DRDY when dtype[1:0] = 11<br>MOD when dtype[1:0] = 10 or 00 |
| dshift_sync | Input data accepted |
| data_out[15:0] | LCD data output |

The module functions in the lcd_clk domain, which is the clock controlling signals flowing through to the LCD display. In this embodiment, all inputs to the module are in the CPU clock domain. In order to minimize synchronization logic, it is required that all inputs be stable before the lcdif_en_sync signal is taken high. The signal lcdif_en_sync passes through synchronizers and can be changed at any time.

A data source not shown in FIG. 3 provides the data to the state machine. The data source can be a DMA, a FIFO, a register, or any combination of these. The exact implementation of this data source is not important for the purposes of this embodiment. Data is provided through the data_in[15:0] input. The dshift sync output signals to the data source that the current data word has been shifted in, and the next word can be presented. The lcd dwidth[1:0] input indicates the width of the data bus input to the LCD module: '00' indicates 4-bits, '01' indicates 8-bits, '11' indicates 16-bits. If the width of the parallel data bus input to the LCD module is not exactly 4, 8 or 16 bits, the lcd_dwidth[1:0] should be set to the next highest value. For example, a 12-bit input will have the data width set to '11' (16-bits) and the four most significant bits will not be used.

Typically, a register interface provides all of the control inputs to the state machine. This register is preferably connected to the CPU to allow changes to the control inputs using a software instruction. However, other configurations are contemplated. In some applications, the values may be set directly or indirectly through the use of electromechanical switches such as dual inline pin switches or rotary switches. In other applications, the values may be set directly or indirectly through the use of a nonvolatile memory such as EPROM, EEPROM, or flash memory.

Various display technologies may be interfaced with a programmable cycle state machine. A subset of available display technologies are described below in detail, but this subset should not be seen as limiting. Other technologies relevant to this invention include, but are not limited to: zero-power bistable display, plasma display, liquid crystal on silicon device, digital micromirror device, light-emitting diode panel, and organic light-emitting diode (OLED) display. The very nature of the invention lends itself to adaptation to new display technologies or existing technologies not previously of interest or available to applications engineers and marketers.

Figure 13:
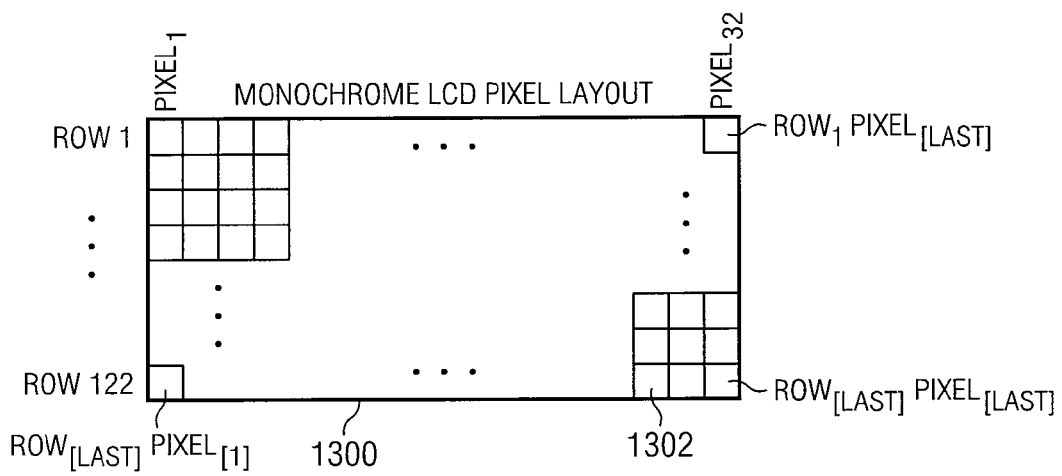
FIG. 13 shows the pixel layout of a 122 by 32 monochrome LCD display with panel and pixels.

Monochrome LCD displays typically have either a 4-bit or 8-bit interface. Since no color information is needed, each data bit represents the state of one pixel. FIG. 13 shows the pixel layout of a 122 by 32 monochrome LCD display with panel 1300 and pixels 1302. The data is input n bits at a time (where n is the data bus width of the panel), with an lshift pulse signaling each valid data transfer. The scan pattern usually starts at the upper left of the glass at $pixel_1$ in $row_1$ and proceeds to the right till it reaches $pixel_{[last]}$ in $row_1$, then starts with pixel in $row_2$, and so on. A pulse on the line output signals the beginning of a new row. Before the end of each row, most displays will require a 'horizontal non-display period'. A pulse on the frame output signals the end of a full display frame and a reset to $row_1$. Before the end of each frame, most displays will require a 'vertical non-display period.' These non-display periods may be built into the pulse widths of the line and frame signals.

While specific display geometries are referenced in various embodiments, these are not intended to be limiting. Graphical displays, including various LCD technologies, are available in a wide range of geometries. For low-cost, embedded applications, displays smaller than VGA (640 by 480 pixels) or even QVGA (320 by 240 pixels) are of primary interest. These modules might be as small as 122 by 32 pixels. Depending on the application, however, one or more embodiments described herein might be used to drive LCD modules with geometries like WVGA (854 by 480 pixels) or larger. In one embodiment, the programmable cycle state machine supports monochrome, STN and TFT display technologies, a variable aspect ratio, resolutions up to VGA (640 by 480 pixels), up to 1024 lcd_clk pulses per line, up to 65,536 lcd_clk pulses per frame, and data widths up to 24-bits.

Figure 12:
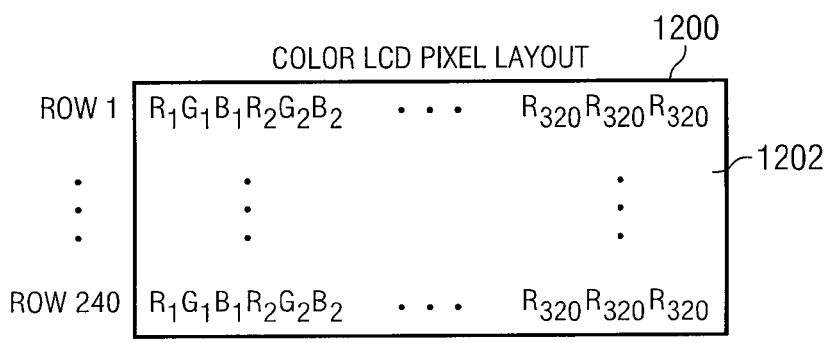
FIG. 12 is a depiction of a typical color liquid crystal display panel indicating the layout of pixels.

Super twisted nematic (STN) displays typically have a 4-, 8- or 16-bit interface. Each color point on the screen is composed of three separate pixels placed side-by-side: one red, one green and one blue. For example, a color QVGA (320× 240 pixels) panel is depicted in FIG. 12 with panel 1200 and pixels 1202. Thus, a panel of 320×240 pixels can be visualized as a panel with 960×240 pixels, with each pixel being one color. The data is output to the panel n bits at a time (where n=data bus width of the panel), with an lshift pulse signaling each valid data transfer. Each bit in the data represents the 'on' or 'off' value of one of the colors.

The scan pattern usually starts at the upper left of the glass at $pixel_1$ in $row_1$ and proceeds to the right till it reaches $pixel_{[last]}$ in $row_1$, then starts with $pixel_1$ in $row_2$, and so on. A pulse on the line output signals the beginning of a new row. Before the end of each row, most displays will require a Horizontal Non-display Period. A pulse on the frame output signals the end of a full display frame and a reset to $row_1$. Before the end of each frame, most displays will require a Vertical Non-display Period. For example, suppose the glass has colors arranged $R_1G_1B_1R_2G_2B_2$ ., etc. A fully red pixel, followed by a fully white pixel, would show on an 8-bit data bus as 100111xx. The last two bits, represented by xx, would be pixels $R_3B_3$, and so on.

There are three common variants of the STN interface. Format 1 is a variant of the STN interface that uses a second clock called LSHIFT2, which is 180° out of phase with the lshift clock. When the programmable cycle state machine is put into STN Format 1, the M output becomes the LSHIFT2 clock. Format 2 is a variant of the STN interface that uses a signal called MOD (on the LCD module) connected to the M output of the state machine. The timing of this signal depends on the LCD module, and may toggle once or more for every toggle of the frame output, depending on the mod_rate[7:0] input. Finally, Dual Scan STN displays have a wider data bus interface that allows the upper and lower halves of the display to be updated at the same time (e.g., a display with 240 rows and an 8-bit interface will have data_out[7:0] transmitting $R_1G_1B_1R_2R_{121}G_{121}B_{121}R_{122}$. The state machine need not have a special setting to support dual scan displays as these displays can be treated as STN displays with twice the data width and half the number of rows. The values presented to data_in[7:0] by the memory will simply have to be reordered accordingly. DSTN displays usually have a Format 2 data interface.

Thin-Film Transistor (TFT) panels offer the best color and contrast quality of the three technologies. This technology has one transistor fabricated on the glass for each pixel. The data interface has separate bits for each color. For example, a 24-bit color TFT will have an 8-bit input for each of the red, green and blue colors. Therefore, data is input to the display as 24-bits, or one pixel, at a time. A pulse on the lshift input while the M output is high signals a valid data transfer. The scan pattern usually starts at the upper left of the glass at $pixel_1$ in $row_1$ and proceeds to the right till it reaches $pixel_{[last]}$ in $row_1$, then starts with $pixel_1$ in $row_2$, and so on. A pulse on the line output signals the beginning of a new row. Before the end of each row, most displays will require a Horizontal Non-display Period. A pulse on the frame output signals the end of a full display frame and a reset to $row_1$. Before the end of each frame, most displays will require a Vertical Non-display Period. The M output of the state machine is connected to an input to the display called DRDY. This signal goes high showing that the output data is valid (i.e., the state machine is not currently in a Vertical or a Horizontal Non-display Period).

More generally, the operational characteristics are as follows. The state machine is enabled when lcdif_en=1. When lcdif_en=0, all outputs are taken low. The timing synchronizer module 200 is the master time keeper of the state machine. The module consists of two counters. One is the frame counter 204 that counts from zero up to frame_per[15:0]. The second is the line counter 206 that counts from zero up to line_per[7:0]. Both counters start counting at the same edge of lcd_clk. The line counter 206 always resets to zero when the frame counter 204 resets to zero. All of the other outputs from the programmable cycle state machine use these counters to count timing for their outputs.

All inputs to the module are in the CPU clock domain. However, lcdif_en_sync and data_in[15:0] are the only two inputs that change when the state machine is active. The first of these inputs, lcdif_en_sync, passes through synchronizers into the lcd_clk domain, to yield the signal lcdif_en (not shown). The second of these inputs, data_in[15:0], does not need to be synchronized for the following reasons:

When the first data_in[15:0] is clocked in (see FIG. 5), the data_in[15:0] is expected to be stable for several lcd_clk periods.

Thereafter, the data_in[15:0] will not change until the dshift_sync output goes high. The dshift_sync is generated from the signal dshift, which in turn is generated by the lcd_clk, thereby providing the required synchronization.

All other inputs are required to be stable, when lcdif_en_sync goes high. The only output from this module that goes back into the CPU clock domain is dshift_sync. This signal is synchronized inside the Data Synchronizer block 400 (described below).

Figure 4:
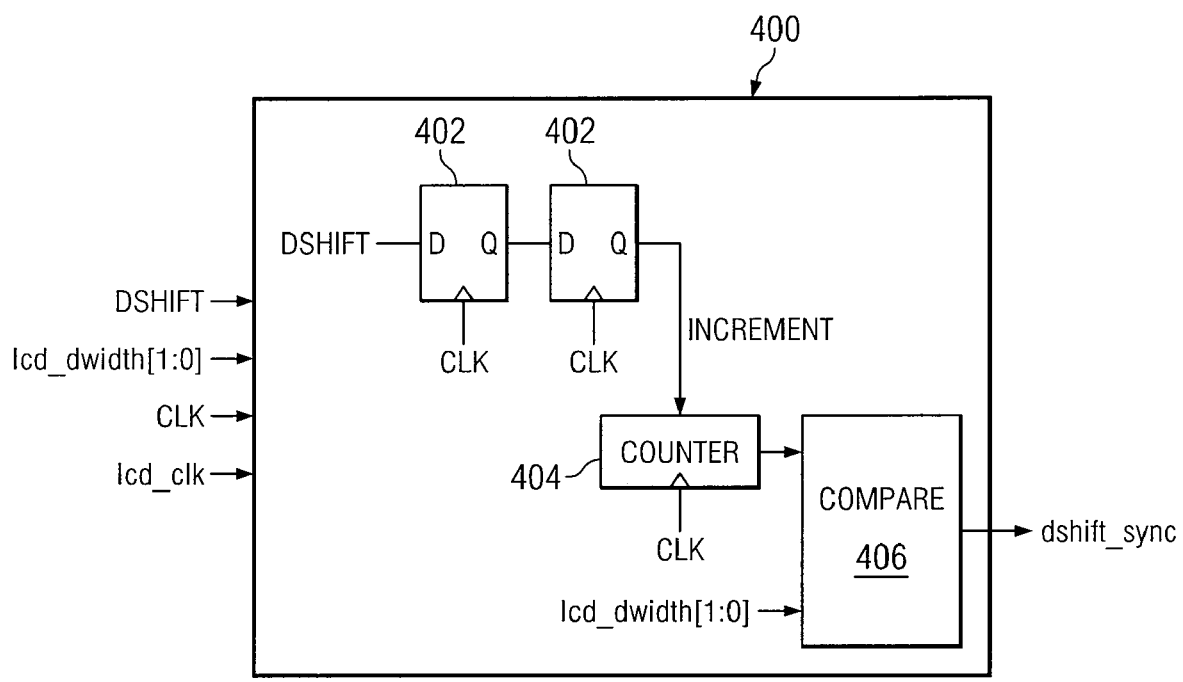
FIG. 4 a block diagram showing circuitry required in one embodiment for transforming the data shift signal from the display clock domain to the CPU clock domain.

FIG. 4 depicts one embodiment of a Data Synchronizer block 400, a circuit designed to synchronize dshift into the CPU timing domain and account for varying input data widths of LCD panels. The synchronizer comprises two D flip flops 402, a counter 404 and a comparator 406. The resulting signal is dshift_sync. The data synchronizer synchronizes the internal dshift signal, which is in the lcd_clk domain, into dshift_sync output signal which is in the CPU clock domain. Also, the dshift_sync signal comprehends the data width of the glass to the input. It generates:

one pulse for every 4 dshift pulse when lcd_dwidth[1:0]='00' one pulse for every 2 dshift pulse when lcd_dwidth[1:0]='01' one pulse for every dshift pulse in all other cases

Figure 5:
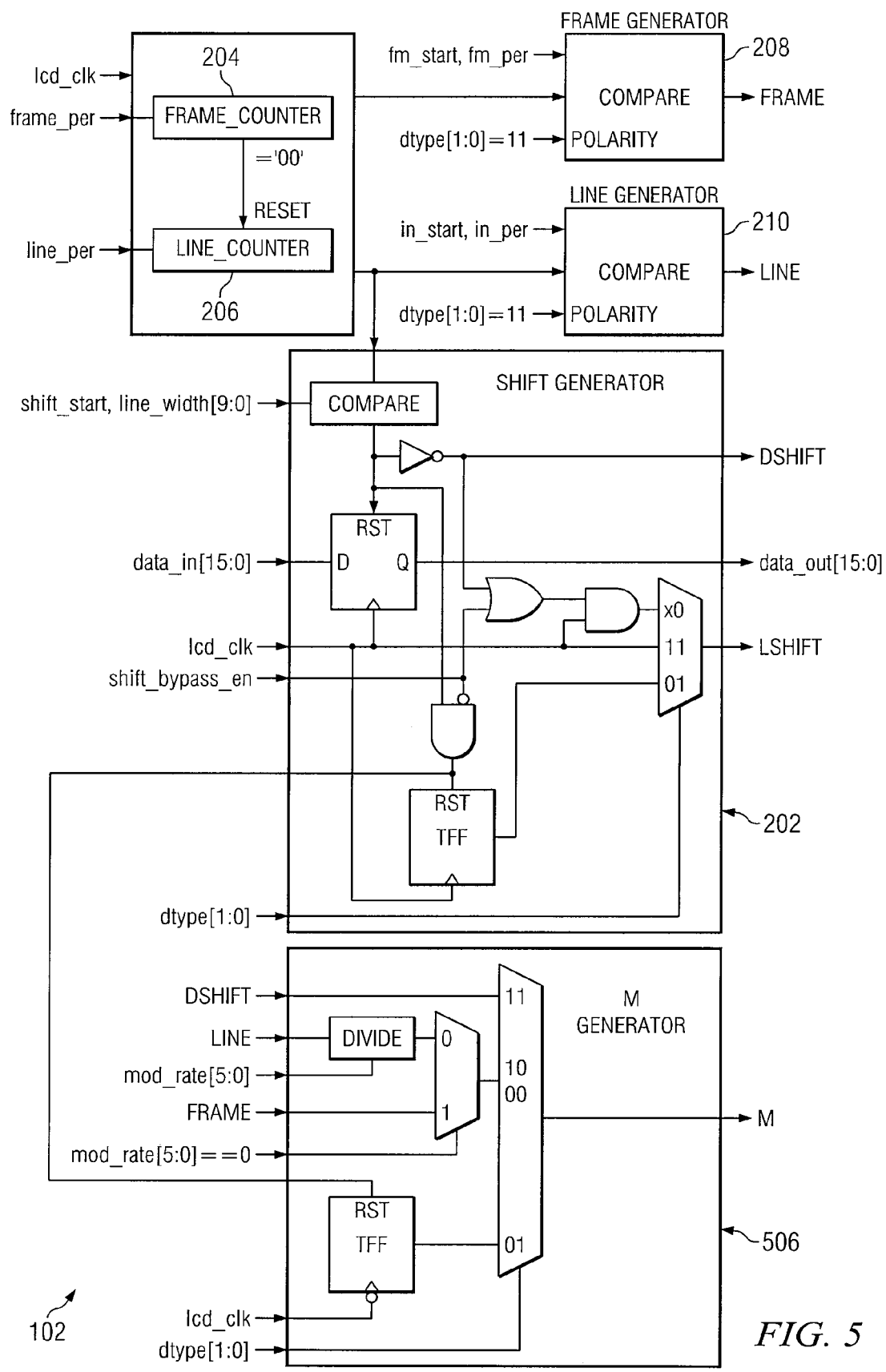
FIG. 5 is a block diagram showing the internal components of one embodiment of the programmable cycle state machine.

FIG. 5 depicts a further embodiment of a programmable cycle state machine 102 including some of the detailed logic and circuitry discussed above. The frame generator 208 generates the frame output. It comprises a comparator that compares the frame_counter 204 to the fm_start input. When the two are equal, the frame output is activated for fm_per number of clock cycles. When dtype[1:0]='11', low is considered active. Otherwise, high is considered active. The line generator 210 generates the line output. This comprises a comparator that compares the line_counter 206 to the ln_start[7:0] input. When the two are equal, the line output is taken active for ln_per[7:0] number of clock cycles. When dtype[1:0]='11', low is considered active. Otherwise, high is considered active.

The shift generator 202 generates the lshift, dshift and data_out[15:0] outputs. It comprises a comparator that compares the line counter 206 to shift_start[7:0]. When the line counter 206 reaches the value shift_start[7:0], the input data_in[15:0] is clocked into a memory on the rising edge of lcd_clk. The data_out[15:0] port is connected directly to the output of this memory. Simultaneously, the dshift output is taken high for one lcd_clk cycle. This process is repeated for line_width[9:0] number of times, to shift out the data in the entire row. When the entire row is shifted out, data_out[15:0] is taken low. The lshift output works differently depending on whether you are connected to a TFT interface or not. This is set using the dtype[1:0] input. When dtype[1:0]='11', the interface is assumed to be connected to a TFT interface. In TFT mode, the lshift output is a direct output of lcd_clk. Otherwise, the interface is assumed to be connected to a non-TFT panel. In TFT mode, the lshift output is a direct output of the lcd_clk when valid data_out[15:0] is being shifted out. During the period when the value of line_counter is less than shift_start[7:0], the lshift output is low. Also, when the last data word has been shifted out, the lshift output is low. If a non-TFT panel that requires a continuous lshift output is present, then the shift_bypass_en input can be taken high. This will output the lcd_clk directly to the lshift output.

M generator 506 depicts logic designed to generate the multipurpose signal M. This depiction is only one possible implementation and should not be seen as limiting in function or implementation. The M output of the timing interface works as set by the dtype[1:0] and the mod rate input. When dtype[1:0]='11', the mod_rate input is ignored. In this mode, the M output functions as a data ready output (DRDY). The M output goes high when line counter 206 reaches the value shift_start[7:0]. It stays until the last data_out[15:0] word is shifted out. When dtype[1:0]='11', the mod rate[7:0] input determines the toggle rate of the M output. When mod_rate [7:0] is zero, the M output toggles at the same time as the frame output. When mod_rate is greater than zero, it represents the number of line output toggles between toggles of the M output.

A further embodiment of the invention is best explained through timing diagrams (FIGS. 6 through 10) indicating the input and output signals under certain conditions. Because the device is expected to interface to a broad spectrum of LCDs from diverse manufacturers, the output signal timing has to be subject to modification. The timing engine allows the output control signals to be adjusted to go high and low at any positive clock edge within the frame by using two inputs for each signal, the xx_start and xx_per inputs. There are also two counters, called the frame_counter and the line_counter.

The frame_counter determines how many lcd_clks are in one frame. It counts up to the value frame_per[15:0], resets to zero, and then repeats. These counters start on the first lcd_clk edge when lcdif_en is sampled high.

The line_counter determines how many lcd_clks there are in one line (row) of the LCD module. This count is the sum of the Horizontal Display Period and the Horizontal Non-display Period. It counts up to the value line_per, resets to zero, and then repeats. The line_counter will also reset at the same instant the frame_counter resets. Note that the number of lcd_clks in the Horizontal Display Period does not necessarily equal the number of pixels in one row of the display. For TFT displays, one lcd_clk usually corresponds to one pixel. But for other display technologies, it varies depending on bus width and color depth. The user can thus program the length of a frame and line.

The last input needed to set up the frame is the line_width [9:0] input. This input determines how many outputs on the data_out[15:0] bus it takes to complete one row. It is assumed each data_out[15:0] output takes one lcd clk period. Thus, this input (when multiplied by the lcd_clk period) gives the total time in the Horizontal Display Period.

For FIGS. 6 through 10, the following settings are assumed:

frame per[15:0]=644: Specifies 644 lcd_clk cycles in each frame. Note that this does not represent an actual value based on a standard display geometry. Rather, it is intended to show the general manner in which this machine can function.

line_per=244: Specifies 244 lcd_clk cycles in each line fm_start=4: Specifies that the frame output should go high when the frame_counter reaches the value '4'.

fm_per=6: Specifies that the frame output should go low when the frame_counter reaches the value '6'.

ln_start=1: Specifies that the line output should go high when the line_counter reaches the value '1'.

ln_per=4: Specifies that the line output should go low when the line_counter reaches the value '4'.

shift_start=4: Specifies that memory 220 should latch in a new value from data_in[15:0] when the frame counter reaches the value '4'. The output of memory 220 directly connects to data_out[15:0].

line_width=n: Specifies that once shift_start is reached, continue clocking in one value every lcd_clk until the line_counter reaches the value 'n'.

Note that all the input settings should be set up before the lcdif_en input is taken high.

Figure 6:
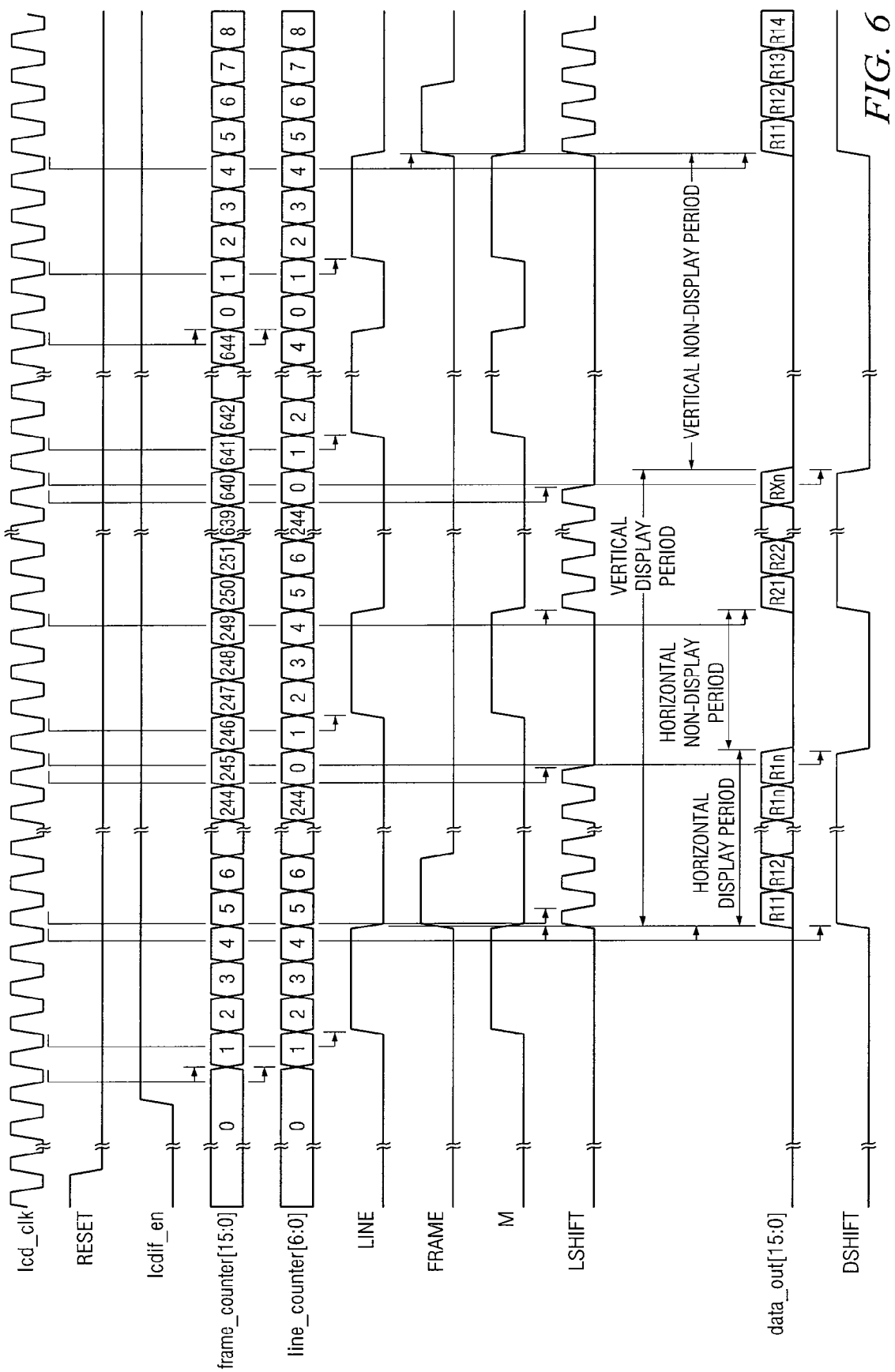
FIG. 6 is a timing diagram showing the output signals of the programmable cycle state machine in an embodiment programmed to drive a monochrome or a format 2 super twisted nematic (STN) display with the shift bypass option disabled.

FIG. 6 depicts the signal timing, as programmed, for a monochrome or STN format 2 display where shift_bypass_en=0. In this embodiment, shift_bypass_en=0 and the input mod_rate=1, which means that the M output toggles at the same rate as the line output. The timing diagram presents slightly more than one frame worth of data transferred, as indicated by the two pulses of the frame signal. The outputs of the programmable cycle state machine are synchronous with the lcd_clk. The two counters begin counting after the reset input has fallen and after the lcdif_en is set to 1, which indicates that the inputs are stable. Line_counter counts from 0 to 244 in this example, the sum of the number of pixels in each line (240 pixels) and the length of the required horizontal non-display period (4 clock cycles). Frame_counter counts from 0 to 644 in this example. Once frame_counter reaches the total frame count, both frame_counter and line_counter reset and the process repeats. The line signal is taken high for three clock cycles based on the line_start and line_per values, which are 1 and 4 respectively, starting on the clock cycle following that in which line_counter equals line_start and ending during the clock cycle in which line_counter equals line_per. Likewise, the frame signal is taken high for two clock signals based on the fm_start and fm_per values, which are 4 and 6 respectively. The M output is substantially the same as the line output in this embodiment. The lshift output is substantially the same as the lcd_clk input, but only during the horizontal display periods. The data_out output represents valid data during the horizontal display periods and is zero or inactive during the non-display periods. The dshift output is taken high only during the horizontal display periods.

Figure 7:
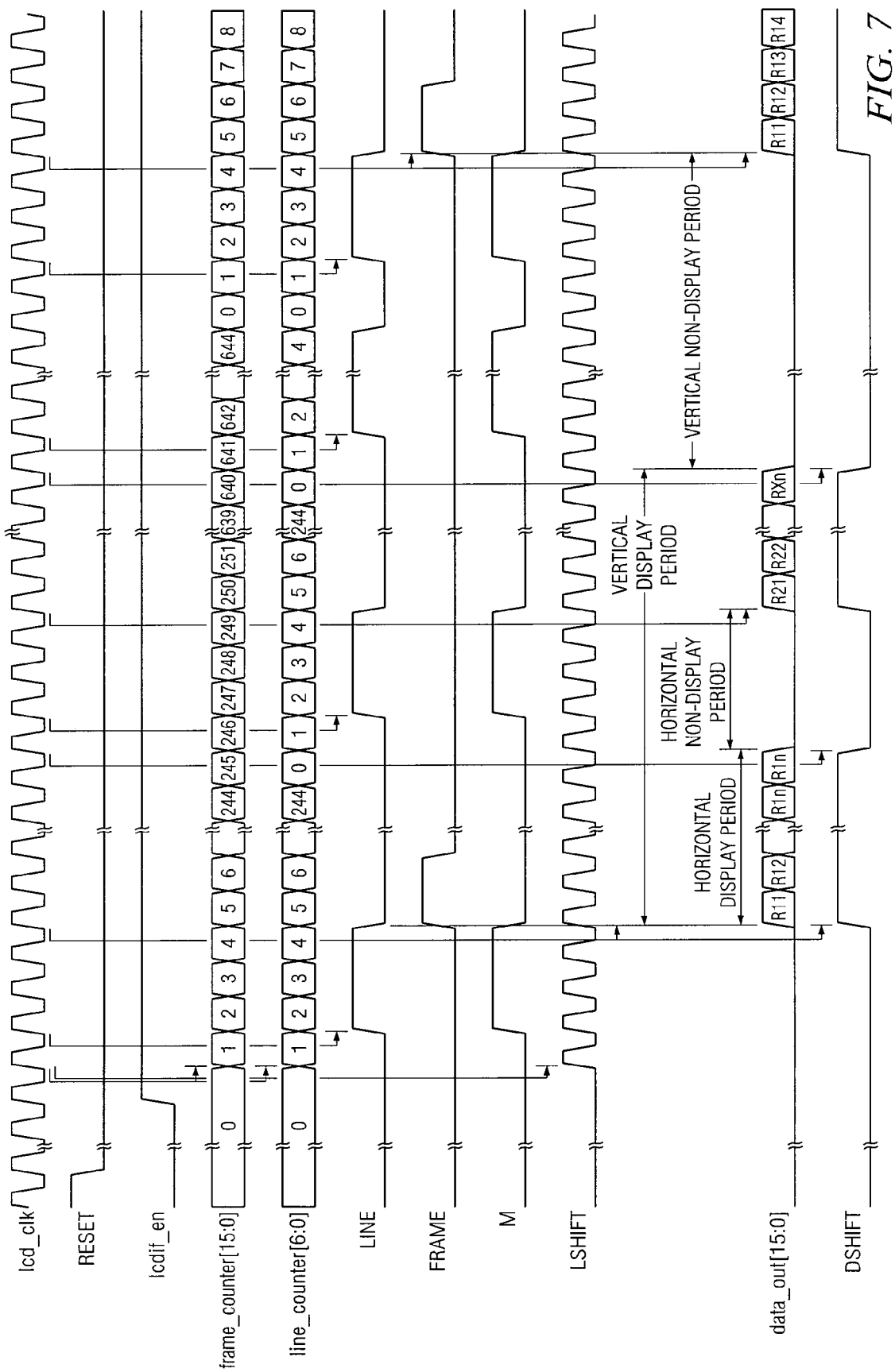
FIG. 7 is a timing diagram showing the output signals of the programmable cycle state machine in an embodiment programmed to drive a monochrome or a format 2 STN display with the shift bypass option enabled.

FIG. 7 depicts the signal timing, as programmed, for a monochrome or STN format 2 display where shift bypass_en=1. The outputs are identical to FIG. 6 with one exception. Because shift bypass_en=1, the lshift signal is a pass through of the lcd_clk input when lcdif_en=1.

Figure 8:
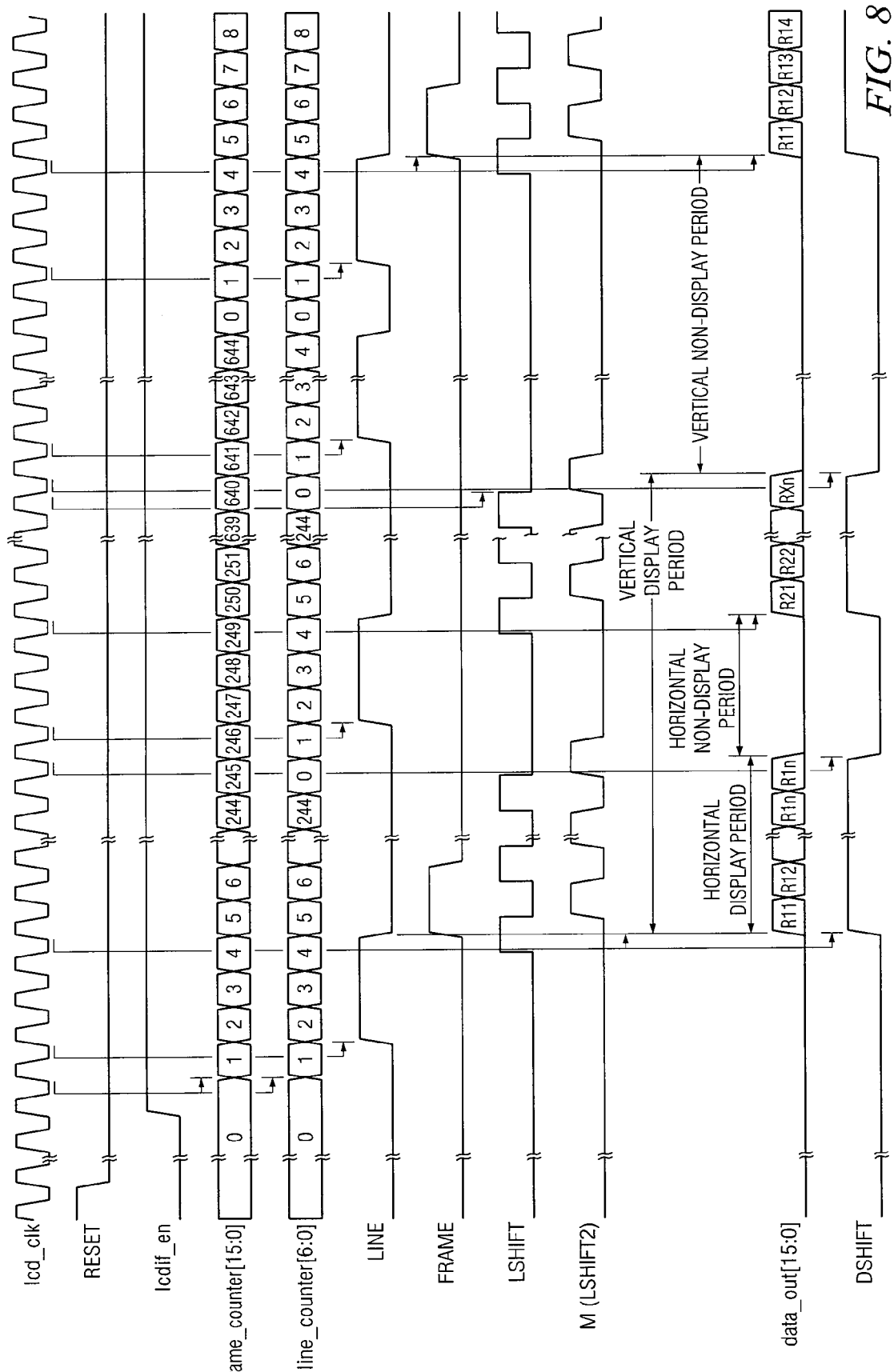
FIG. 8 is a timing diagram showing the output signals of the programmable cycle state machine in an embodiment programmed to drive a format 1 STN display with the shift bypass option disabled.

FIG. 8 depicts the signal timing, as programmed, for a STN format 1 display with shift_bypass_en=0. The input mod rate is disregarded in this display type. Here, the lshift output is active just before the horizontal display period begins and toggles on each lcd_clk signal during that period. The waveform on the M output, functionally called LSHIFT2, is substantially the same as lshift except that it is 180 degrees out of phase.

Figure 9:
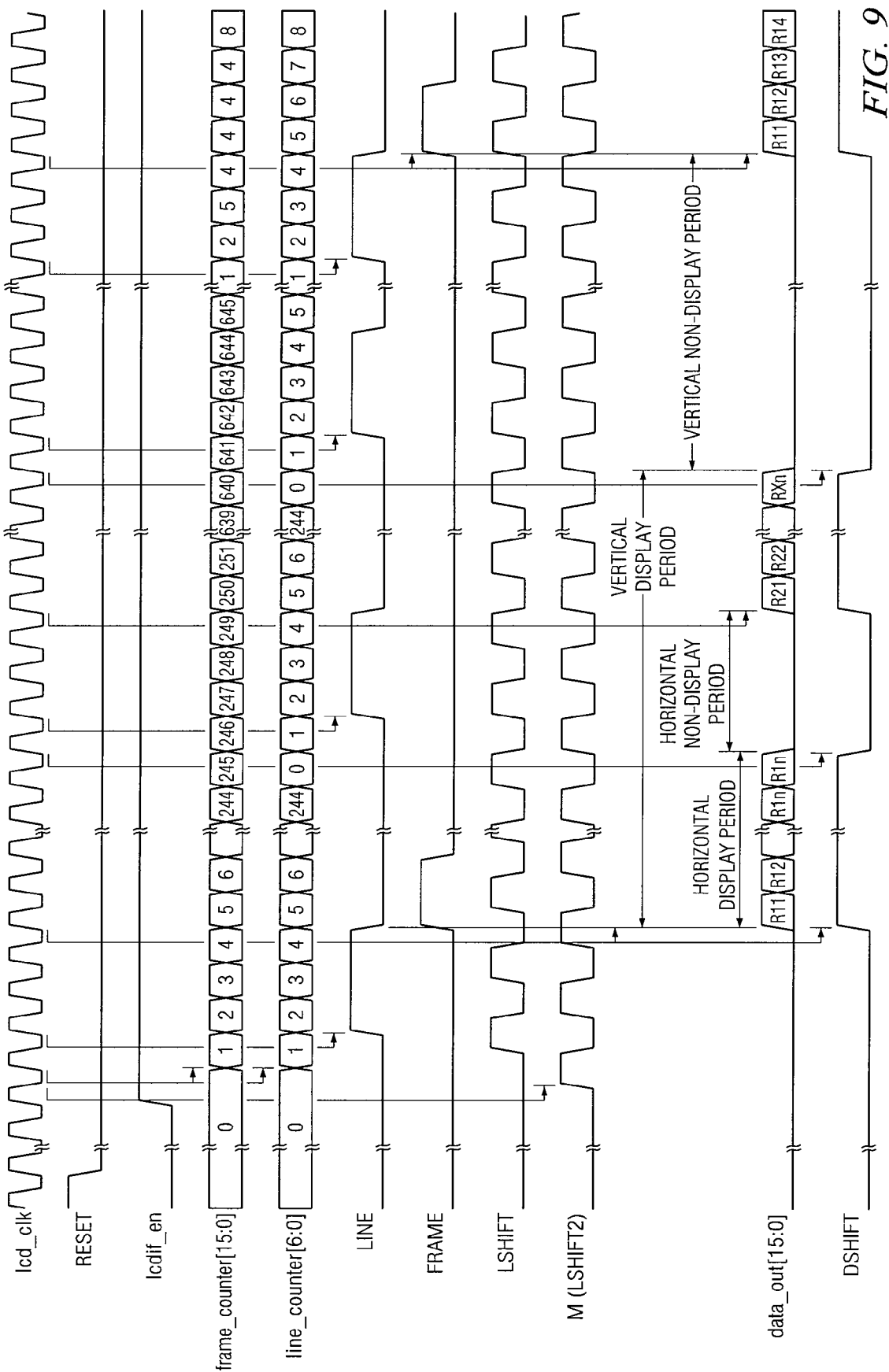
FIG. 9 is a timing diagram showing the output signals of the programmable cycle state machine in an embodiment programmed to drive a format 1 STN display with the shift bypass option enabled.

FIG. 9 depicts the signal timing, as programmed, for a STN format 1 display with shift bypass_en=1. Here, the M output, representing LSHIFT2, goes high with lcdif_en and toggles each lcd_clk cycle. The lshift output is the same waveform, but phase shifted 180°.

Figure 10:
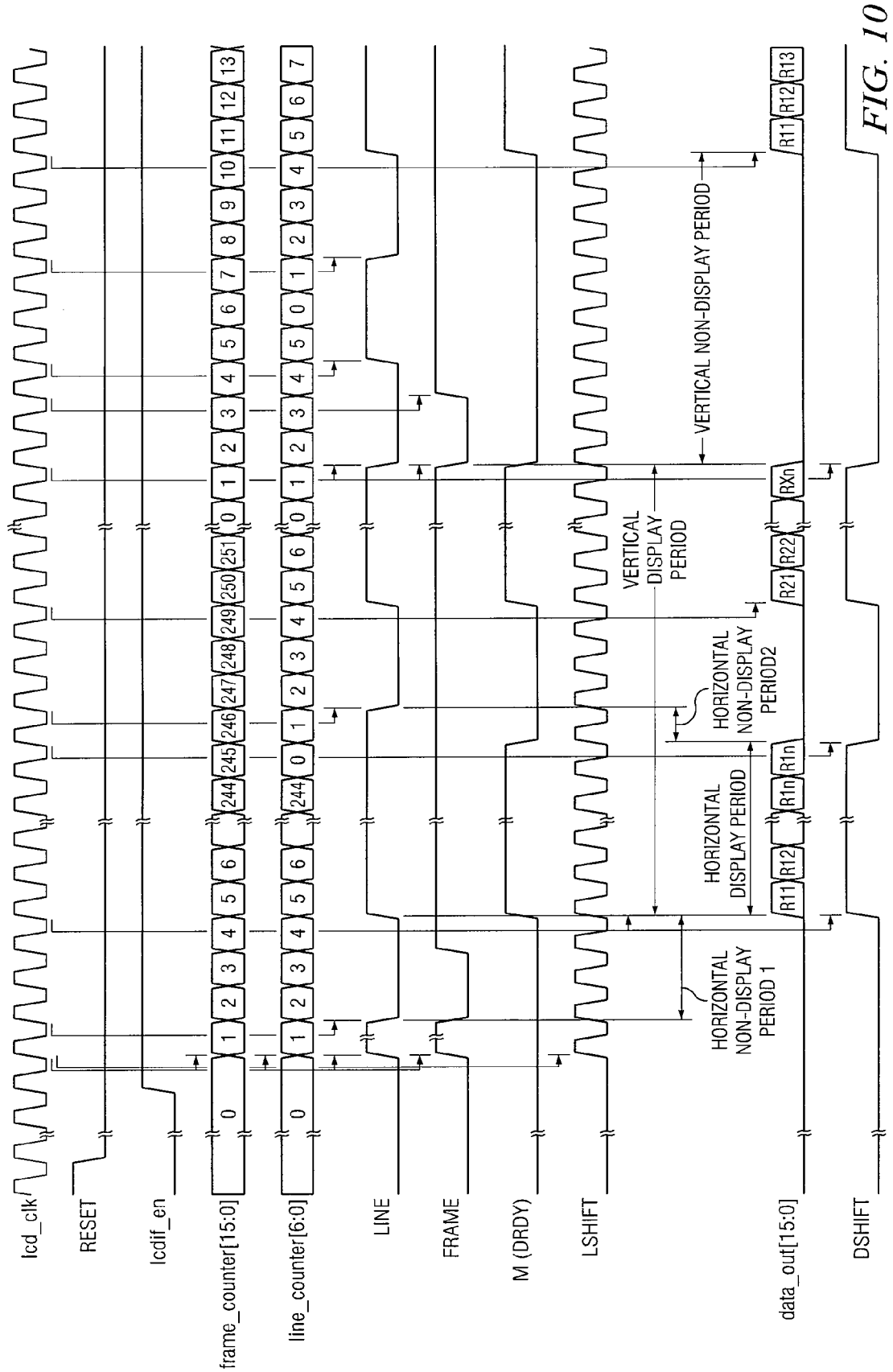
FIG. 10 is a timing diagram showing the output signals of the programmable cycle state machine in an embodiment programmed to drive a thin film transistor display.

FIG. 10 depicts the signal timing, as programmed, for a TFT display. In this display type, the inputs shift_bypass_en and mod_rate are disregarded. The M output, functionally called DRDY, goes high only during active data transfer cycles, or only during horizontal display periods. The frame output has reversed polarity here as well, because dtype[1:0]=11.

Figure 11:
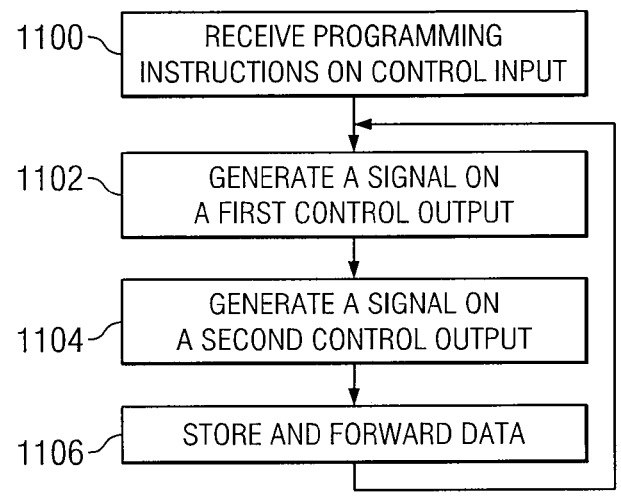
FIG. 11 is a block diagram of the steps required to drive a graphics display according to one embodiment of the programmable cycle state machine.

FIG. 11 depicts the steps performed in the method of using a programmable cycle state machine to drive a video display. Step 1100 is a step for receiving programming instructions on a control input. Step 1102 is a step for generating a signal on a first control output. Step 1104 is a step for generating a signal on a second control output. Step 1106 is a step for storing and forwarding video data.

Although the present invention and its advantages have been described in detail, it should be understood that various changes, substitutions and alterations can be made herein without departing from the spirit and scope of the invention as defined by the following claims.

What is claimed is:

1. A programmable cycle state machine on an integrated circuit comprising:
   a first central processing unit (CPU);
   a memory interfaced with the CPU;
   a state machine;
   a first parallel data bus connecting the memory to the state machine;
   a second parallel data bus;
   a clock input coupled to the state machine and receiving a clock signal;
   a first control output coupled to an input/output device;
   a second control output coupled to the memory and is independent from said first control output; and
   a control input coupled from the memory to the state machine,
   wherein a value of the first control output is a function of the clock input, the current state of the state machine, and the control input;
   wherein a value of the first parallel data bus is being outputted on the second parallel data bus as a function of the clock input, the current state of the state machine, and the control input;
   wherein the second control output requests the next value for the first parallel data bus; and
   wherein the state machine is programmable through the control input.

2. The programmable cycle state machine according to claim 1,
   wherein the second parallel data bus and the Out control output are connected to a graphics display device,
   wherein the state machine is operable to generate a frame signal, a line signal, a first shift signal, and a multipurpose signal on the first control output, and
   wherein the timing and duration of the frame signal, the line signal, the first shift signal, and the multipurpose signal are software programmable in timing and duration through the control input.

3. The programmable cycle state machine according to claim 2, wherein the multipurpose signal can be programmed to indicate any of the following:
   a display enable output (DRDY) operable to control a thin-film transistor (TFT) display,
   a second shift signal operable to control a format 1 liquid crystal display (LCD), or
   a backplane bias signal (MOD) operable to control a monochrome or format 2 LCD display.

4. The programmable cycle state machine according to claim 2, wherein the state machine supports the control signal timing required by at least four different graphics display technologies from a set consisting of:
   monochrome liquid crystal display (LCD),
   color super twisted nematic (STN) liquid crystal display,
   double-layer super twisted nematic (DSTN) liquid crystal display,
   color thin-film transistor (TFT) liquid crystal display,
   zero-power bistable display,
   plasma display,
   liquid crystal on silicon device,
   digital micromirror device,
   light-emitting diode panel,
   organic light-emitting diode (OLED) display.

5. The programmable cycle state machine according to claim 2,
   wherein the control input contains instructions for programming the state machine comprising:
   the bit-depth of a value passed from the first parallel data bus to the second parallel data bus,
   the number of values representing each pixel of video,
   the geometry of the video display, and
   the video display technology.

6. The programmable cycle state machine according to claim 5,
   wherein the bit-depth may range between 1 bit and 16 bits,
   wherein each pixel may be represented by one value or three values, and
   wherein the geometry of the video display may range between 64 by 64 pixels and 854 by 480 pixels.

7. The programmable cycle state machine according to claim 1, wherein the value of the second parallel data bus can be output on the parallel first data bus as a function of the clock input, the current state of the state machine, and the control input.

8. The programmable cycle state machine according to claim 7, further comprising a status input wherein data is received from an input device on the second parallel data bus and transmitted on the first parallel data bus controlled in part by the value of the status input.

9. The programmable cycle state machine according to claim 8, wherein the state machine is operable to retrieve image or video data from an external sensor array.

10. The programmable cycle state machine according to claim 1, wherein the first output control signal comprises a bit clock signal and a sample frequency signal operable for supplying digital audio data to a digital to analog controller.

11. A programmable cycle state machine on an integrated circuit comprising:
 a first central processing unit (CPU);
 a memory interfaced with the CPU;
 a state machine;
 a first parallel data bus connecting the memory to the state machine;
 a second parallel data bus;
 a clock input coupled to the state machine and receiving a clock signal;
 a first control output coupled to an input/output device;
 a second control output coupled to the memory and is independent from said first control output; and
 a control input coupled from the memory to the state machine,
 wherein a value of the first control output is a function of the clock input, the current state of the state machine, and the control input;
 wherein a value of the first parallel data bus is being outputted on the second parallel data bus as a function of the clock input, the current state of the state machine, and the control input;
 wherein the second control output requests the next value for the first parallel data bus; and
 wherein the state machine is programmable through the control input,
 wherein the second parallel data bus and the first control output are connected to a graphics display device,
 wherein the state machine is operable to generate a frame signal, a line signal, a first shift signal, and a multipurpose signal on the first control output, and
 wherein the timing and duration of the frame signal, the line signal, the first shift signal, and the multipurpose signal are software programmable in timing and duration through the control input,
 wherein the control input contains instructions for programming the state machine comprising:
 the bit-depth of a value passed from the first parallel data bus to the second parallel data bus,
 the number of values representing each pixel of video,
 the geometry of the video display, and
 the video display technology.

12. The programmable cycle state machine according to claim 11, wherein the multipurpose signal can be programmed to indicate any of the following:
 a display enable output (DRDY) operable to control a thin-film transistor (TFT) display,
 a second shift signal operable to control a format 1 liquid crystal display (LCD), or
 a backplane bias signal (MOD) operable to control a monochrome or format 2 LCD display.

13. The programmable cycle state machine according to claim 12, wherein the state machine supports the control signal timing required by at least four different graphics display technologies from a set consisting of:
 monochrome liquid crystal display (LCD),
 color super twisted nematic (STN) liquid crystal display,
 double-layer super twisted nematic (DSTN) liquid crystal display,
 color thin-film transistor (TFT) liquid crystal display,
 zero-power bistable display,
 plasma display,
 liquid crystal on silicon device,
 digital micromirror device,
 light-emitting diode panel,
 organic light-emitting diode (OLED) display.

14. The programmable cycle state machine according to claim 11,
 wherein the bit-depth may range between 1 bit and 16 bits,
 wherein each pixel may be represented by one value or three values, and
 wherein the geometry of the video display may range between 64 by 64 pixels and 854 by 480 pixels.

* * * * *

UNITED STATES PATENT AND TRADEMARK OFFICE
CERTIFICATE OF CORRECTION

| | | |
|---|---|---|
| PATENT NO. | : 7,816,943 B2 | Page 1 of 1 |
| APPLICATION NO. | : 12/139640 | |
| DATED | : October 19, 2010 | |
| INVENTOR(S) | : Roshan Samuel | |

It is certified that error appears in the above-identified patent and that said Letters Patent is hereby corrected as shown below:

Column 14, Line 16: The word "Out" should be deleted and replaced with --first--.

Signed and Sealed this
Twelfth Day of April, 2011

David J. Kappos
*Director of the United States Patent and Trademark Office*